US010068305B2

(12) United States Patent
Sisk et al.

(10) Patent No.: US 10,068,305 B2
(45) Date of Patent: Sep. 4, 2018

(54) MODELING POTENTIALLY HAZARDOUS SITES AND PREDICTING HAZARDOUS CONDITIONS

(71) Applicant: WellAware Holdings, Inc., San Antonio, TX (US)

(72) Inventors: David Allen Sisk, San Antonio, TX (US); Roel Almendarez, San Antonio, TX (US); Cody James Lee, San Antonio, TX (US)

(73) Assignee: WellAware Holdings, Inc., San Antonio, TX (US)

( * ) Notice: Subject to any disclaimer, the term of this patent is extended or adjusted under 35 U.S.C. 154(b) by 766 days.

(21) Appl. No.: 14/546,273

(22) Filed: Nov. 18, 2014

(65) Prior Publication Data

US 2015/0149377 A1 May 28, 2015

Related U.S. Application Data

(60) Provisional application No. 61/908,452, filed on Nov. 25, 2013.

(51) Int. Cl.
*G06F 17/00* (2006.01)
*G06N 5/02* (2006.01)
*G06Q 50/26* (2012.01)

(52) U.S. Cl.
CPC .................................. *G06Q 50/265* (2013.01)

(58) Field of Classification Search
USPC ........................................................... 706/46
See application file for complete search history.

(56) References Cited

U.S. PATENT DOCUMENTS

| | | | |
|---|---|---|---|
| 4,585,932 | A | 4/1986 | Roberts et al. |
| 4,665,385 | A | 5/1987 | Henderson |
| 5,132,968 | A | 7/1992 | Cephus |
| 6,085,576 | A | 7/2000 | Sunshine et al. |
| 6,114,964 | A | 9/2000 | Fasano |
| 6,252,510 | B1 | 6/2001 | Dungan |

(Continued)

OTHER PUBLICATIONS

Bureau of Transportation Statistics—Special Report—Data-Driven Risk Models Could Help Target Pipeline Safety Inspections; by Rick Kowalewski, Pipeline and Hazardous Materials Safety Administration, and Peg Young, Ph.D., Bureau of Transportation Statistics, Jul. 2008, pp. 1-6.*

(Continued)

*Primary Examiner* — Michael B Holmes
(74) *Attorney, Agent, or Firm* — Fish & Richardson P.C.

(57) ABSTRACT

Implementations include methods for monitoring and reporting on actual hazardous conditions at a facility including actions of receiving data associated with a site, the site being susceptible to potentially hazardous conditions, processing the data, one or more models, and one or more prediction rules, determining that a hazardous condition is predicted to occur at the site, providing output data reflecting the hazardous condition, processing the output data to provide indicator data for providing a graphical representation of the site, the graphical representation providing a graphical depiction of the hazardous condition, and providing the indicator data to one or more user devices, the indicator data being processed by each of the one or more user devices to display the graphical representation.

20 Claims, 8 Drawing Sheets

(56) References Cited

U.S. PATENT DOCUMENTS

| | | | | |
|---|---|---|---|---|
| 6,891,476 | B2 | 5/2005 | Kitaguchi et al. | |
| 6,967,589 | B1 | 11/2005 | Peters | |
| 7,210,342 | B1 | 5/2007 | Sterner et al. | |
| 7,463,142 | B2 | 12/2008 | Lindsay | |
| 8,078,410 | B2 * | 12/2011 | Marquardt | G01N 21/21 702/28 |
| 8,095,314 | B2 * | 1/2012 | Wilson | G06N 7/00 702/181 |
| 2006/0176169 | A1 | 8/2006 | Doolin et al. | |
| 2007/0150428 | A1 * | 6/2007 | Webb | G06N 5/04 706/46 |
| 2007/0179640 | A1 | 8/2007 | Moughler | |
| 2008/0122641 | A1 | 5/2008 | Amidi | |
| 2008/0129525 | A1 * | 6/2008 | Barrus | G08B 25/002 340/669 |
| 2008/0169934 | A1 | 7/2008 | Lang et al. | |
| 2008/0208474 | A1 * | 8/2008 | Wilson | G01W 1/10 702/3 |
| 2009/0113990 | A1 | 5/2009 | Groves | |
| 2009/0165528 | A1 | 7/2009 | Qian et al. | |
| 2010/0018288 | A1 | 1/2010 | Yamanaka et al. | |
| 2010/0280765 | A1 * | 11/2010 | Marquardt | G01N 21/21 702/24 |
| 2011/0161885 | A1 | 6/2011 | Gonia et al. | |
| 2011/0246088 | A1 | 10/2011 | Santos | |
| 2012/0173162 | A1 | 7/2012 | Wang | |
| 2012/0268280 | A1 | 10/2012 | Hatch et al. | |
| 2013/0271286 | A1 | 10/2013 | Quan et al. | |
| 2014/0138259 | A1 | 5/2014 | Mickelson et al. | |
| 2014/0305845 | A1 | 10/2014 | Ramachandran et al. | |
| 2015/0032434 | A1 * | 1/2015 | Lee | G01V 11/00 703/10 |
| 2015/0149377 | A1 * | 5/2015 | Sisk | G06Q 50/265 705/325 |
| 2015/0261788 | A1 * | 9/2015 | Sisk | G06F 17/30247 707/755 |
| 2015/0263934 | A1 * | 9/2015 | Sisk | H04L 45/124 370/329 |
| 2015/0356482 | A1 * | 12/2015 | Whipple | G06Q 10/06313 705/7.23 |
| 2017/0076209 | A1 * | 3/2017 | Sisk | G05B 23/00 |

OTHER PUBLICATIONS

Estimation of current through human body in case of contact with pipeline in the vicinity of a 50 Hz-electrified railway Bosko Milesevic; Noël Haddad 2013 International Symposium on Electromagnetic Compatibility Year: 2013 pp. 877-882 IEEE Conferences.*

Modeling and simulation of a high accurate aircraft ground-based positioning and landing system, Ahmad Abbas Al-Ameen Salih; O. K. Ariff; Amzari Zhahir; Mohamed Tarmizi Ahmad, 2013 IEEE International Conference on Space Science and Communication (IconSpace) Year: 2013 pp. 324-330 IEEE Conferences.*

Research and application of a karst ground collapse risk assessment information system in Shenzhen Universiade Center (China) Xueping Li; Guangli Xu 2012 IEEE Symposium on Robotics and Applications (ISRA) Year: 2012 pp. 540-543 IEEE Conferences.*

On-line monitoring and prediction for transmission line sag, Ren Lijia; Li Hong; Liu Yan 2012 IEEE International Conference on Condition Monitoring and Diagnosis, Year: 2012 pp. 813-817 IEEE Conferences.*

Application of Complex Event Processing Paradigm in Situation Awareness and Management Sanja Vranes; Mladen Stanojevic; Valentina Janev; Vuk Mijovic; Nikola Tomasevic; Lydia Kraus; Zoran Ilic 2011 22nd International Workshop on Database and Expert Systems Applications Year: 2011 pp. 289-293 IEEE Conference.*

Copenheaver, International Search Report and Written Opinion, International Application No. PCT/US2014/064729, dated Feb. 23, 2015, 11 pages.

Copenheaver, International Search Report and Written Opinion for International application No. PCT/US2014/047753, dated Nov. 13, 2014, 9 pages.

* cited by examiner

MODELING POTENTIALLY HAZARDOUS SITES AND PREDICTING HAZARDOUS CONDITIONS

CROSS-REFERENCE TO RELATED APPLICATIONS

This application claims priority to U.S. Prov. App. No. 61/908,452, filed Nov. 25, 2013, which is expressly incorporated herein by reference in the entirety.

BACKGROUND

Sites, such as oil and gas well-sites, can incur hazardous conditions. Example hazardous conditions can include the presence of gas that can have adverse effects, if inhaled. In some cases, personnel visit sites to remedy hazardous conditions, which can cost time and money, as well as expose personnel to potential risk. Avoiding occurrences of hazardous conditions can reduce time and cost associated with management of a site, and can mitigate risk.

SUMMARY

Implementations of the present disclosure include computer-implemented methods for modeling potentially hazardous sites and predicting hazardous conditions. In some implementations, actions include receiving data associated with a site, the site being susceptible to potentially hazardous conditions, processing the data, one or more models, and one or more prediction rules, determining that a hazardous condition is predicted to occur at the site, providing output data reflecting the hazardous condition, processing the output data to provide indicator data for providing a graphical representation of the site, the graphical representation providing a graphical depiction of the hazardous condition, and providing the indicator data to one or more user devices, the indicator data being processed by each of the one or more user devices to display the graphical representation. Other implementations include corresponding systems, apparatus, and computer programs, configured to perform the actions of the methods, encoded on computer storage devices.

These and other implementations can each optionally include one or more of the following features: the output data includes one or more predicted values reflective of the hazardous condition, a predicted value including a value that is provided based on an actual value and the one or more models, the one or more models include at least one of a site model, a fluid-flow model, and a weather model, the site model models physical features of the site, the site model models topographical features of the site, topographical features of the site include topographical features that are within a threshold distance from the site, the fluid-flow model models flow of one or more fluids, the one or more fluids include at least one of hydrogen sulfide (H2S), methane (CH4), carbon monoxide (CO), and carbon dioxide (CO2), data includes data measured at the site, the data includes weather data received from one or more weather sources, the weather data includes at least one of local weather data, regional weather data and national weather data, a weather source includes a weather station located at the site, the graphical representation includes an indicator of the hazardous condition at the site, the indicator includes location and severity of the hazardous condition with respect to the site, the graphical representation further includes a time indicator, the time indicator indicating a date and/or time, at which the hazardous condition is predicted to be present, the site includes at least one of a production well-site, an exploration well-site, a configuration well-site, an injection well-site, an observation well-site, and a drilling well-site, the site includes at least a portion of an above-ground appurtenance, the above-ground appurtenance includes a pipeline, the site includes an intermediate site located between end-point sites, and an end-point site includes one of a well-site and a refinery.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
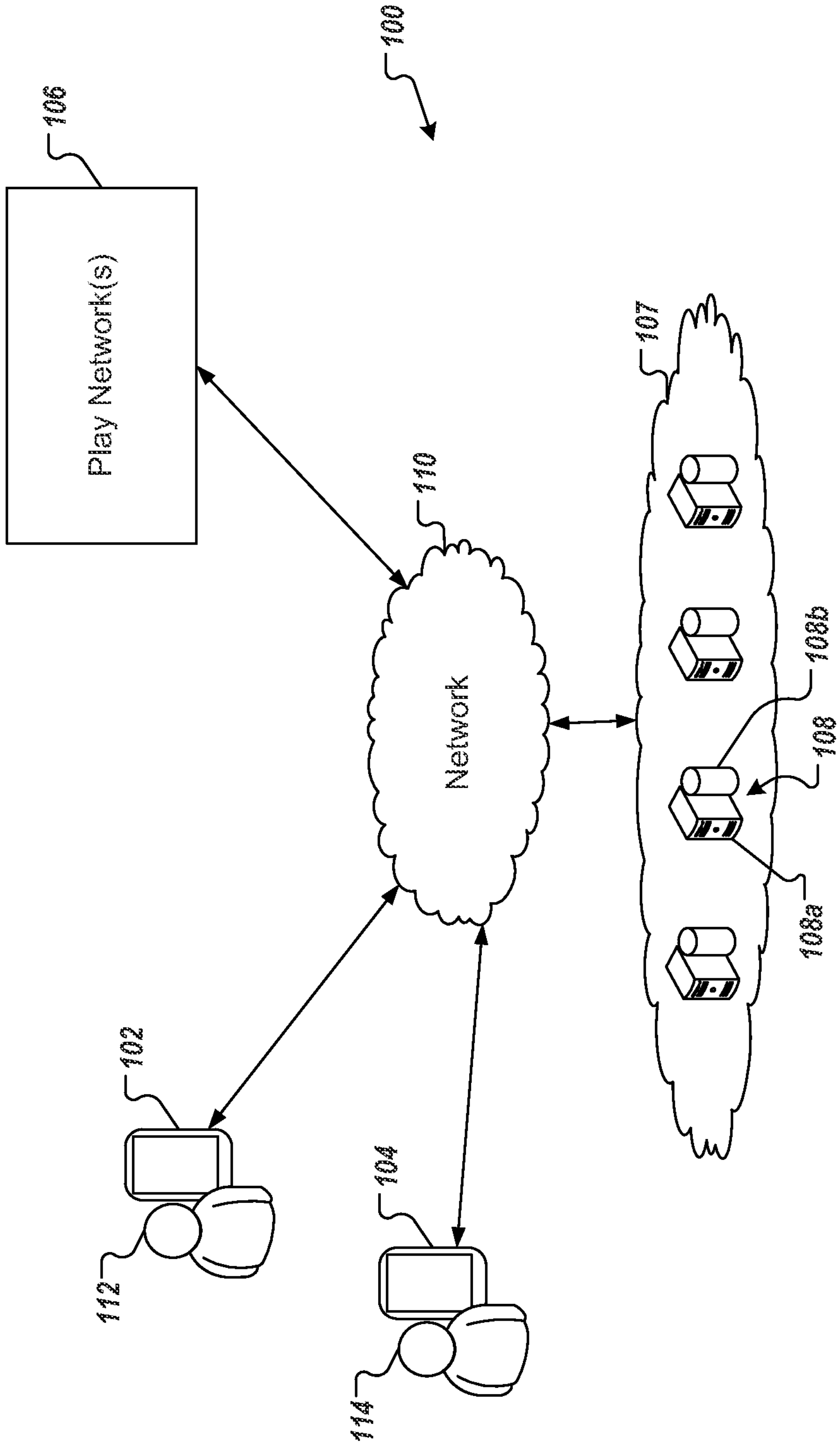
FIG. 1 depicts an example system in accordance with implementations of the present disclosure.

Implementations of the present disclosure are generally directed to monitoring potentially hazardous sites and predicting hazardous conditions. More specifically, implementations of the present disclosure process data associated with potentially hazardous sites based on one or more models. In some examples, the data includes data associated with equipment located at the site. In some examples, the data includes sensor data from one or more sensors located at the site. In some examples, the data includes topographical data associated with the site. In some examples, the data includes weather data, e.g., local, regional, national, corresponding to weather that can affect and/or does affect the site. In accordance with implementations of the present disclosure, the one or more models and the data are processed to predict occurrence of hazardous conditions occurring at the site. Further, the data and the one or more models are processed to determine a potential extent, e.g., time, location and/or severity of the predicted hazardous conditions. In some implementations, one or more graphical user interfaces (GUIs) can be presented on computing devices, which depict representations of the predicted hazardous conditions at the site.

Implementations of the present disclosure are generally applicable to sites that have potential to have hazardous conditions present. In some examples, hazardous conditions can include conditions that could be physically harmful to humans, animals, and/or vegetation. Example conditions can include the presence of a hazardous fluid, e.g., gas, liquid.

Implementations of the present disclosure will be discussed in further detail with reference to an example context. The example context includes oil and gas well-sites. It is appreciated, however, that implementations of the present disclosure can be realized in other appropriate contexts, e.g., a chemical plant, a fertilizer plant, tank batteries (located away from a site), above-ground appurtenances (pipelines) and/or intermediate sites. An example intermediate site can include a central delivery point that can be located between a site and a refinery, for example. Within the example context, implementations of the present disclosure are discussed in further detail with reference to an example sub-context. The example sub-context includes a production well-site. It is appreciated, however, that implementations of the present disclosure can be realized in other appropriate sub-contexts, e.g., an exploration well-site, a configuration well-site, an injection well-site, an observation well-site, and a drilling well-site.

In the example context and sub-context, well-sites can be located in natural resource plays. A natural resource play can be associated with oil and/or natural gas. In general, a natural resource play includes an extent of a petroleum-bearing formation, and/or activities associated with petroleum development in a region. An example geographical region can include southwestern Texas in the United States, and an example natural resource play includes the Eagle Ford Shale Play.

FIG. 1 depicts an example system 100 that can execute implementations of the present disclosure. The example system 100 includes one or more computing devices, such as computing devices 102, 104, one or more play networks 106, and a computing cloud 107 that includes one or more computing systems 108. The example system 100 further includes a network 110. The network 110 can include a large computer network, such as a local area network (LAN), wide area network (WAN), the Internet, a cellular network, a satellite network, a mesh network, e.g., 900 Mhz, one or more wireless access points, or a combination thereof connecting any number of mobile clients, fixed clients, and servers. In some examples, the network 110 can be referred to as an upper-level network.

The computing devices 102, 104 are associated with respective users 112, 114. In some examples, the computing devices 102, 104 can each include various forms of a processing device including, but not limited to, a desktop computer, a laptop computer, a tablet computer, a wearable computer, a handheld computer, a personal digital assistant (PDA), a cellular telephone, a network appliance, a smart phone, an enhanced general packet radio service (EGPRS) mobile phone, or an appropriate combination of any two or more of these example data processing devices or other data processing devices. The computing systems 108 can each include a computing device 108*a* and computer-readable memory provided as a persistent storage device 108*b*, and can represent various forms of server systems including, but not limited to a web server, an application server, a proxy server, a network server, or a server farm.

In some implementations, and as discussed in further detail herein, site data (e.g., oil data and/or gas data) can be communicated from one or more of the play networks 106 to the computing systems 108 over the network 110. In some examples, each play network 106 can be provided as a regional network. For example, a play network can be associated with one or more plays within a geographical region. In some examples, each play network 106 includes one or more sub-networks. As discussed in further detail herein, example sub-networks can include a low power data sub-network, e.g., a low power machine-to-machine data network (also referred to as a smart data network and/or an intelligent data network, one or more wireless sub-networks, and mesh sub-networks, e.g., 900 Mhz.

In some examples, the computing systems 108 store the well data and/or process the well data to provide auxiliary data. In some examples, the well data and/or the auxiliary data are communicated over the play network(s) 106 and the network 110 to the computing devices 102, 104 for display thereon. In some examples, user input to the computing devices 102, 104 can be communicated to the computing systems 108 over the network 110.

In general, monitoring of well sites can include oil well monitoring and natural gas well monitoring (e.g., pressure(s), temperature(s), flow rate(s)), compressor monitoring (e.g., pressure, temperature), flow measurement (e.g., flow rate), custody transfer, tank level monitoring, hazardous gas detection, remote shut-in, water monitoring, cathodic protection sensing, asset tracking, water monitoring, access monitoring, and valve monitoring. In some examples, monitoring can include monitoring the presence and concentration of fluids (e.g., gases, liquids). In some examples, control capabilities can be provided, such as remote valve control, remote start/stop capabilities, remote access control.

Figure 2:
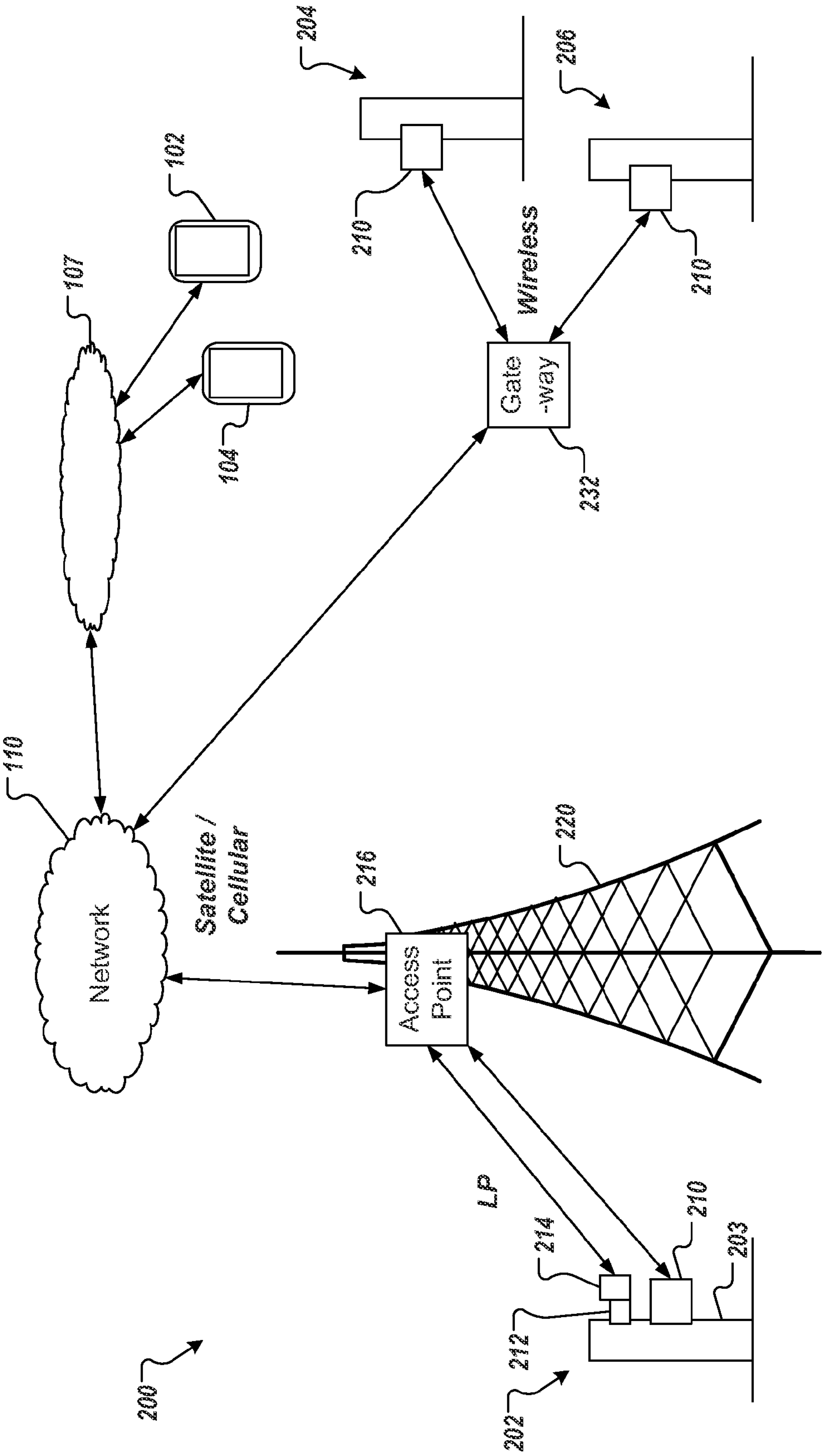
FIG. 2 depicts an example portion of a play network.

FIG. 2 depicts an example portion of an example play network 200. The example play network 200 provides low power (LP) communication, e.g., using a low power data network, and cellular and/or satellite communication for well data access and/or control. In some examples, as discussed herein, LP communication can be provided by a LP network. In the example of FIG. 2, a first well site 202, a second well site 204 and a third well site 206 are depicted. Although three well sites are depicted, it is appreciated that the example play network 200 can include any appropriate number of well sites. In the example of FIG. 2, well monitoring and data access for the well site 202 is provided using LP communication and cellular and/or satellite communication, and well monitoring and data access for the well sites 204, 206 is provided using cellular, satellite, and/or mesh network communication.

The example of FIG. 2 corresponds to the example context and sub-context (a production well-site) discussed above. It is appreciated, however, that implementations of the present disclosure. In the depicted example, the well site 202 includes a wellhead 203, a sensor system 210, a sensor system 212 and communication device 214. In some examples, the sensor system 210 includes a wireless communication device that is connected to one or more sensors, the one or more sensors monitoring parameters associated with operation of the wellhead 203. In some examples, the wireless communication device enables monitoring of discrete and analog signals directly from the connected sensors and/or other signaling devices. In some examples, the sensor system 210 can provide control functionality (e.g., valve control). Although a single sensor system 210 is depicted, it is contemplated that a well site can include any appropriate number of sensor systems 210. In some examples, the sensor system 212 includes one or more sensors that monitor parameters associated with operation of the wellhead 203. In some examples, the sensor system 212 generates data signals that are provided to the communication device 214, which can forward the data signals. Although a single sensor system 212 and communication device 214 are depicted, it is contemplated that a well site can include any appropriate number of sensor systems 212 and/or communication devices 214.

Well data and/or control commands can be provided to/from the well site 202 through an access point 216. More particularly, information can be transmitted between the access point 216, the sensor system 210, and/or the communication device 214 based on LP. In some examples, LP provides communication using a globally certified, license free spectrum (e.g., 2.4 GHz). In some examples, the access point 216 provides a radial coverage that enables the access point 216 to communicate with numerous well sites, such as the well site 202. In some examples, the access point 216 further communicates with the network 110 using cellular, satellite, mesh, point-to-point, point-to-multipoint radios, and/or terrestrial or wired communication.

In the depicted example, the access point 216 is mounted on a tower 220. In some examples, the tower 220 can include an existing telecommunications or other tower. In some examples, an existing tower can support multiple functionalities. In this manner, erection of a tower specific to one or more well sites is not required. In some examples, one or more dedicated towers could be erected.

In the depicted example, the well sites 204, 206 include respective wellheads 205, 207, and respective sensor systems 210 (discussed above). Although a single sensor system 210 is depicted for each well site 204, 206, it is contemplated that a well site can include any appropriate number of sensor systems 210. In some examples, well data and/or control commands can be provided to/from the well sites 202 through a gateway 232. More particularly, information can be transmitted between the gateway 232, and the sensor systems 210 can be wireless communication (e.g., radio frequency (RF)). In some examples, the gateway 232 further communicates with the network 110 using cellular and/or satellite communication.

In accordance with implementations of the present disclosure, well site control and/or data visualization and/or analysis functionality (e.g., hosted in the computing cloud 107 of FIGS. 1 and 2) and one or more play networks (e.g., the play networks 106, 200 of FIGS. 1 and 2) can be provided by a service provider. In some examples, the service provider provides end-to-end services for a plurality of well sites. In some examples, the service provider owns the one or more play networks and enables well site operators to use the play networks and control/visualization/monitoring functionality provided by the service provider. For example, a well site operator can operate a plurality of well sites. The well site operator can engage the service provider for well site control/visualization/monitoring services (e.g., subscribe for services). In some examples, the service provider and/or the well site operator can install appropriate sensor systems, communication devices and/or gateways (e.g., as discussed above with reference to FIG. 2). In some examples, sensor systems, communication devices and/or gateways can be provided as end-points that are unique to the well site operator.

In some implementations, the service provider can maintain one or more indices of end-points and well site operators. In some examples, the index can map data received from one or more end-points to computing devices associated with one or more well site operators. In some examples, well site operators can include internal server systems and/or computing devices that can receive well data and/or auxiliary data from the service provider. In some examples, the service provider can receive messages from well sites, the messages can include, for example, well data and an end-point identifier. In some examples, the service provider can route messages and/or auxiliary data generated by the server provider (e.g., analytical data) to the appropriate well site operator or personnel based on the end-point identifier and the index. Similarly, the service provider can route messages (e.g., control messages) from a well site operator to one or more appropriate well sites.

As introduced above, implementations of the present disclosure are directed to monitoring potentially hazardous sites and predicting occurrence of hazardous conditions. More specifically, implementations of the present disclosure process data associated with potentially hazardous sites based on one or more models, and/or one or more prediction rules. In the example context and sub-context, the site includes a production well-site. As discussed in further detail herein, the data can include data associated with equipment located at the site, the data can include sensor data from one or more sensors located at the site, the data can include topographical data associated with the site, and/or the data can include weather data corresponding to weather that can affect or does affect the site. In some examples, data can include properties of one or more substances, e.g., fluids, that are monitored. Example properties can include molecular weight, critical point and/or phase properties, e.g., solid, liquid, gaseous.

In some implementations, a model can include a physical model of a well-site. For example, the model can model the type, size and location of equipment present at the well-site. In some examples, the model can include topographical features present at the well-site. Example topographical features can include vegetation, dips, valleys, berms, hills, troughs, mountains and the like. In some examples, the topographical features include features within a threshold distance from a well-site, e.g., within a 5 mile radius of the well-site. In some implementations, a model can include a weather pattern model of the well-site. For example, the model can model temperatures, winds and other appropriate meteorological characteristics that can affect the well-site. In some examples, the weather model can be based on local, regional and/or national weather patterns. In some examples, the weather model can process local, regional and/or national weather data. In some implementations, a model can include a fluid flow model that can model the flow of one or more types of fluids at the well-site. In some examples, the weather data can include current data, e.g., measured temperature, barometric pressure, wind-speed, humidity, precipitation. In some examples, the weather data can include forecasted data, e.g., forecasted temperature, barometric pressure, wind-speed, humidity, precipitation.

In some implementations, a prediction rule can define parameters that are associated with occurrence of a hazardous condition. In some examples, a prediction rule can be specific to a particular entity present at a well-site. Example entities can include equipment, conduits (piping) and the like. In some examples, a set of prediction rules can be provided for a particular well-site, the set of prediction rules comprising prediction rules associated with entities present at the particular well-site.

In some examples, a prediction rule can associate a hazardous condition to one or more parameters. By way of example, an example hazardous condition can include venting of a gas, e.g., H2S, from a storage tank. In this example, a prediction rule can be associated the hazardous condition to a pressure threshold and/or a temperature threshold. For example, the prediction rule can provide that, if a pressure and/or a temperature associated with the storage tank respectively exceed the pressure threshold and/or the temperature threshold, hazardous gas will be vented from the storage tank, e.g., with some probability. In some examples, more complex prediction rules can be provided. For example, a prediction rule can provide predicted rates of venting of gases based on predicted temperatures and/or pressures.

In accordance with implementations of the present disclosure, the one or more models, the data, and the one or more prediction rules are processed to predict occurrences of hazardous conditions at the site. Further, the data, the one or more models, and the one or more prediction rules are processed to determine an extent, e.g., location and/or severity of predicted hazardous conditions. In some implementations, one or more graphical user interfaces (GUIs) can be presented one computing devices, which depict representations of the predicted hazardous conditions at the site.

Figure 3:
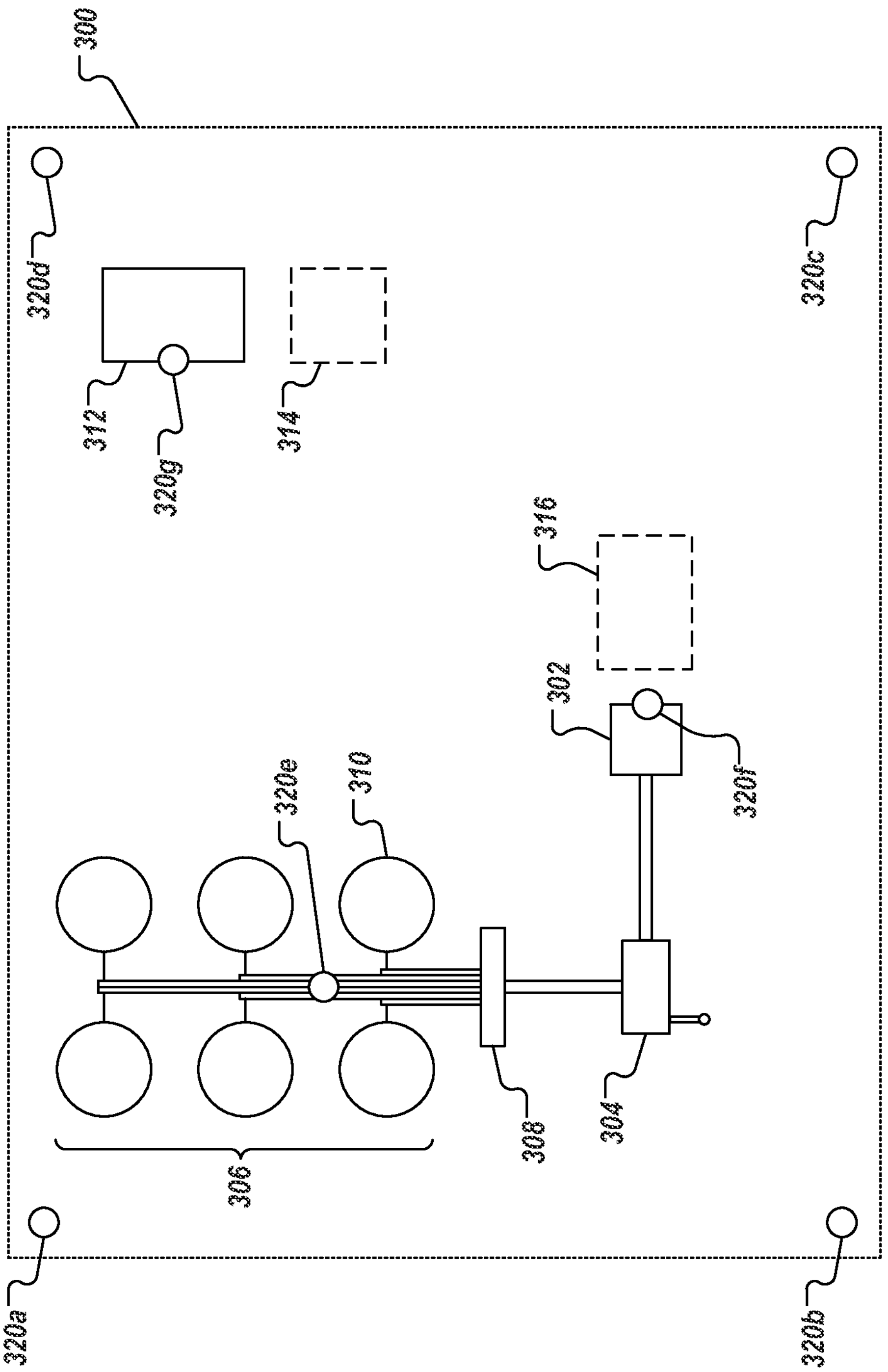
FIG. 3 depicts a representation of an example well-site.

FIG. 3 depicts a representation of an example well-site 300. The example well-site 300 can include a production well-site, in accordance with the example sub-context provided above. In the depicted example, the well-site 300 includes a well-head 302, an oil and gas separator 304 and a storage tank system 306. In the depicted example, the storage tank system 306 includes a manifold 308 and a plurality of storage tanks 310. The example well-site 300 further includes a base station 312. In some examples, the well-site 300 can include a local weather station 314. In some examples, the well-site 300 can include artificial lift equipment 316, e.g., to assist in extraction of oil and/or gas from the well.

In some examples, the well-site 300 includes one or more sensors 320*a*-320*g*. In some examples, each sensor 320*a*-320*g* can be provided as a single sensor. In some examples, each sensor 320*a*-320*g* can be provided as a cluster of sensors, e.g., a plurality of sensors. Example sensors can include fluid sensors, e.g., gas sensors, temperature sensors, and/or pressure sensors. Each sensor 320*a*-320*g* is responsive to a condition, and can generate a respective signal based thereon. In some examples, the signals can be communicated through a network, as discussed above with reference to FIG. 2.

Implementations of the present disclosure will be described in further detail with reference to an example hazardous condition. The example hazardous condition includes the presence of a hazardous gas. It is appreciated that implementations of the present disclosure are applicable to other appropriate hazardous conditions. Example hazardous gases can include hydrogen sulfide (H2S), methane, carbon monoxide (CO), carbon dioxide (CO2). Implementations of the present disclosure will be described in further detail with reference to H2S. In some examples, a hazardous gas might not be hazardous to humans, for example, in sufficiently small concentrations, e.g., less than a threshold parts per million (PPM). In some examples, a hazardous gas can be hazardous in sufficiently high concentrations, e.g., equal to or greater than the threshold PPM.

Referring again to FIG. 3, sensors 320*a*-320*g* can include temperature sensors and/or pressure sensors. For example, the sensors 320*a*-320*g* can be responsive to the temperature and/or pressure of a fluid. That is, the sensors 320*a*-320*g* can generate respective signals that indicate the temperature and/or pressure of a fluid.

As discussed herein, data from the sensors 320*a*-320*g* can be provided to a back-end system for processing. For example, data can be provided through a play network, e.g., the play network(s) 106 of FIG. 1, to a computing cloud, e.g., the computing cloud 107. The computing cloud can process the data and other data, as well as one or more models and one or more prediction rules, to provide output to one or more computing devices, e.g., the computing devices 102, 104 of FIG. 1. For example, and as discussed in further detail herein, the computing cloud can process the data and the one or more models, and the one or more prediction rules to predict the occurrence of a hazardous condition, e.g., the presence and concentration of a hazardous gas, and to provide one or more graphical representations of a well-site for display on a computing device.

In some implementations, the computing cloud can include one or more models for each well-site of a plurality of monitored well-sites. For example, the one or more models can be stored in computer-readable memory. In some examples, the computing cloud can include properties associated with hazardous materials that can be present at the well-site. For example, the properties can be stored in computer-readable memory. Data associated with the well-site can be received by the computing cloud. For example, data, e.g., signals, generated at the well-site can be provided to the computing cloud through one or more networks. In some examples, one or more external sources can provide data associated with the well-site. For example, meteorological data can be provided from one or more weather services, e.g., local, regional and/or national weather services. In some examples, meteorological data can be provided directly from the well-site, e.g., from a weather station located at the well-site (monitoring wind speed/direction, temperature, humidity, and/or barometric pressure).

In some implementations, the computing cloud can retrieve the one or more prediction rules, e.g., from a rule repository. In some examples, the one or more prediction rules can be generic to all sites. In some examples, the one or more prediction rules can be specific to a particular site, or a particular set of sites. In some examples, the cloud computing device can retrieve site-specific prediction rules based on an identifier associated with a particular site.

In some examples, the computing cloud processes the one or more models, the data, and the one or more prediction rules using an engine to provide output data. In some examples, the output data indicates time, locations and/or concentrations of hazardous gas predicted to be present at the well-site. In some examples, the computing cloud processes the one or more models, the data and the one or more prediction rules in response to a trigger signal. In some examples, the trigger signal can be provided as a periodic signal, such that occurrence of a hazardous condition can be periodically determined, e.g., every hour, once a day, once a week. In some examples, the trigger signal can be provided as one or more sensor signals. For example, if a temperature sensor indicates a temperature that exceeds a threshold temperature, it can be determined that the one or more models, the data, and the one or more prediction rules are to be processed predict whether a hazardous condition will occur. In some examples, the trigger signal can be provided in response to user input, the user input indicating a request to perform prediction for one or more well-sites.

In some examples, the output data can be processed to generate graphical representations, discussed in further detail herein. For example, the output data can include an array of gas type, time, location and concentration data, such that particular locations within the well-site are associated with a predicted gas concentration at a particular time. In some examples, output data can be provided as a tuple of values. The following example tuple can be provided:

Output Data=[G, L, C, t]

where G indicates a predicted gas type, e.g., H2S, CO, CO2, CH4, L indicates a predicted location within a well-site, C indicates a predicted concentration, and t indicates a predicted time. In this example, the tuple can indicate a prediction that a gas G having a concentration C will be present at a location L at time t. In some examples, a location within a site can include coordinate data, e.g., x-y coordinates in two-dimensional space, x-y-z coordinates in three-dimensional space. In some examples, a location can include different concentrations of gas at different times. In some examples, a location can include multiple gases at a single time.

In some examples, a first value for gas concentration can be provided as a predicted value at a first location, e.g., a pressure relief valve. A second value for gas concentration can be provided as a predicted value at a second location, e.g., a location immediately adjacent to the first location. In some examples, the second value can be provided based on the first value, one or more previously predicted values associated with the second location, one or more previously predicted values associated with the first location, gas properties, weather data, one or more models, e.g., fluid flow model, weather model, model of the well-site, and one or more prediction rules.

In some examples, the output data can also include probability data. The following example tuple can be provided:

Output Data=[P, G, L, C, t]

where P indicates a probability. In some examples, the probability can be provided within a range, e.g., from 0 to 1, from 0%-100%. In this example, the tuple can indicate a probability (likelihood) that the prediction of a gas G having a concentration C will be at a location L at time t will come to fruition.

By way of example, and as noted above, an example hazardous condition can include venting of a gas, e.g., H2S, from a storage tank. In some examples, current conditions associated with the storage tank and the well-site can be determined. Example current conditions can include an actual pressure and/or temperature associated with the storage tank, e.g., based on signals received from pressure and/or temperature sensors, as well as an ambient temperature associated with the well-site, e.g., based on signals received from temperatures sensors, and/or meteorological data provided from a weather service. In some examples, forecasted temperature data can be provided and can indicate an increase in ambient temperature from the current ambient temperature. In accordance with implementations of the present disclosure, it can be determined that the pressure and/or temperature associated with the storage tank will likely exceed respective threshold values based on the predicted ambient temperature, leading to a hazardous condition.

In accordance with implementations of the present disclosure, the output data is processed to provide graphical representations of the predicted hazardous condition at the well-site. In some examples, the graphical representations include one or more indicators, such as gas maps, discussed in further detail herein, that indicate the predicted presence and/or concentration of hazardous materials. For example, for each output data tuple, discussed above, an indicator can be generated, and can be included in the graphical representations. In some examples, for a plurality of output data tuples, a plurality of indicators are provided, that collectively provide an overall condition indicator. For example, each indicator can provide a portion of a condition indicator, e.g., gas map.

In some examples, a characteristic of the indicator can be provided based on values provided in the output data. Example characteristics can include color, shape and/or pattern. In the example case of color, a first concentration value (or range of values) can be associated with a first color, and a second concentration value (or range of values) can be associated with a second color. If a first concentration value provided in a first output data tuple corresponds to the first concentration value, a first indicator that is provided for the first output data tuple is assigned the first color. Similarly, if a second concentration value provided in a second output data tuple corresponds to the second concentration value, a second indicator that is provided for the second output data tuple is assigned the second color. The first indicator and the second indicator together can define at least a portion of the condition indicator.

In some examples, the output data is processed to provide an array of indicator data. In some examples, indicator data can be provided as a tuple of values. The following example tuple can be provided:

Indicator Data=[L, X]

where X indicates the characteristic to be displayed at location L. In some examples, the indicator data is processed to depict the condition indicator as part of the graphical representation of the well-site.

Figure 4:
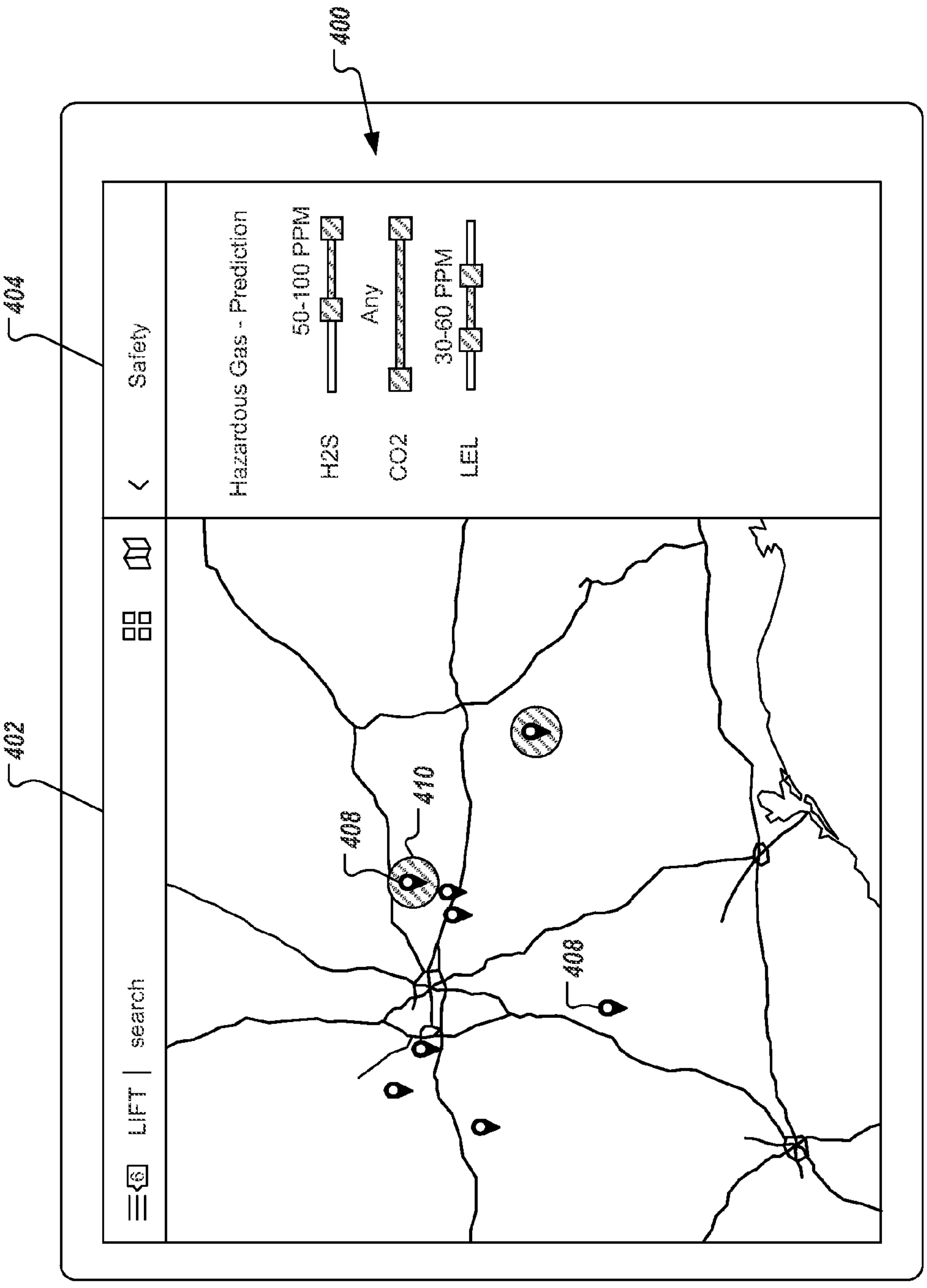
FIG. 4 depicts an example screen-shot in accordance with implementations of the present disclosure.

FIG. 4 depicts an example screen-shot in accordance with implementations of the present disclosure. The example screen-shot includes a GUI 400 that includes a map frame 402 and a sensor type frame 404. In the depicted example, the map frame 402 depicts a map, e.g., a graphical representation, of a geographical region, which includes one or more well-sites. In the depicted example, well-sites can be indicated by markers 408. In some examples, the GUI can provide zooming and/or scrolling of the map displayed within the map frame 402 based on user input.

In some examples, the sensor type frame 404 provides an interface for a user to select a type of sensor, for which data is requested, and/or to provide filter parameters to affect the map displayed in the map frame 402. In the depicted example, safety sensors have been selected and filter options are provided for H2S, CO2 and lower explosive limit (LEL). For example, the user can provide input to select respective concentration levels to filter well-sites that are depicted in the map frame 402. That is, the markers 408 can correspond to well-site that meet the filter parameters provided in the sensor type frame 404. In the depicted example, the markers 408 indicates well-sites that include the predicted presence of H2S in concentrations within the range of 50 PPM to 100 PPM, that include any predicted presence of CO2, and that include predicted LEL within the range of 30 PPM to 60 PPM.

In some implementations, markers 408 can include graphical indicators 410, e.g., halos. In some examples, the indicators 410 can indicate the imminent occurrence of a hazardous condition, e.g., the probability of the hazardous condition exceeds a threshold probability. In some examples, the indicators 410 can be provided independently of filter settings provided in the sensor type frame 404. For example, it can be determined that a particular well-site includes the imminent occurrence of a hazardous condition. Consequently, a marker 408 and/or indicator 410 for the well-site can be provided in the map frame 402, regardless of whether the filter settings would otherwise filter the well-site from being indicated in the map frame 402.

In accordance with implementations of the present disclosure, graphical representations of well-sites can be provided, which graphically depict the presence and extent of a predicted hazardous condition. For example, the user can select a marker 408 that includes an indicator 410 and, in response to the user selection, a graphical depiction of the well-site can be displayed.

Figure 5A:
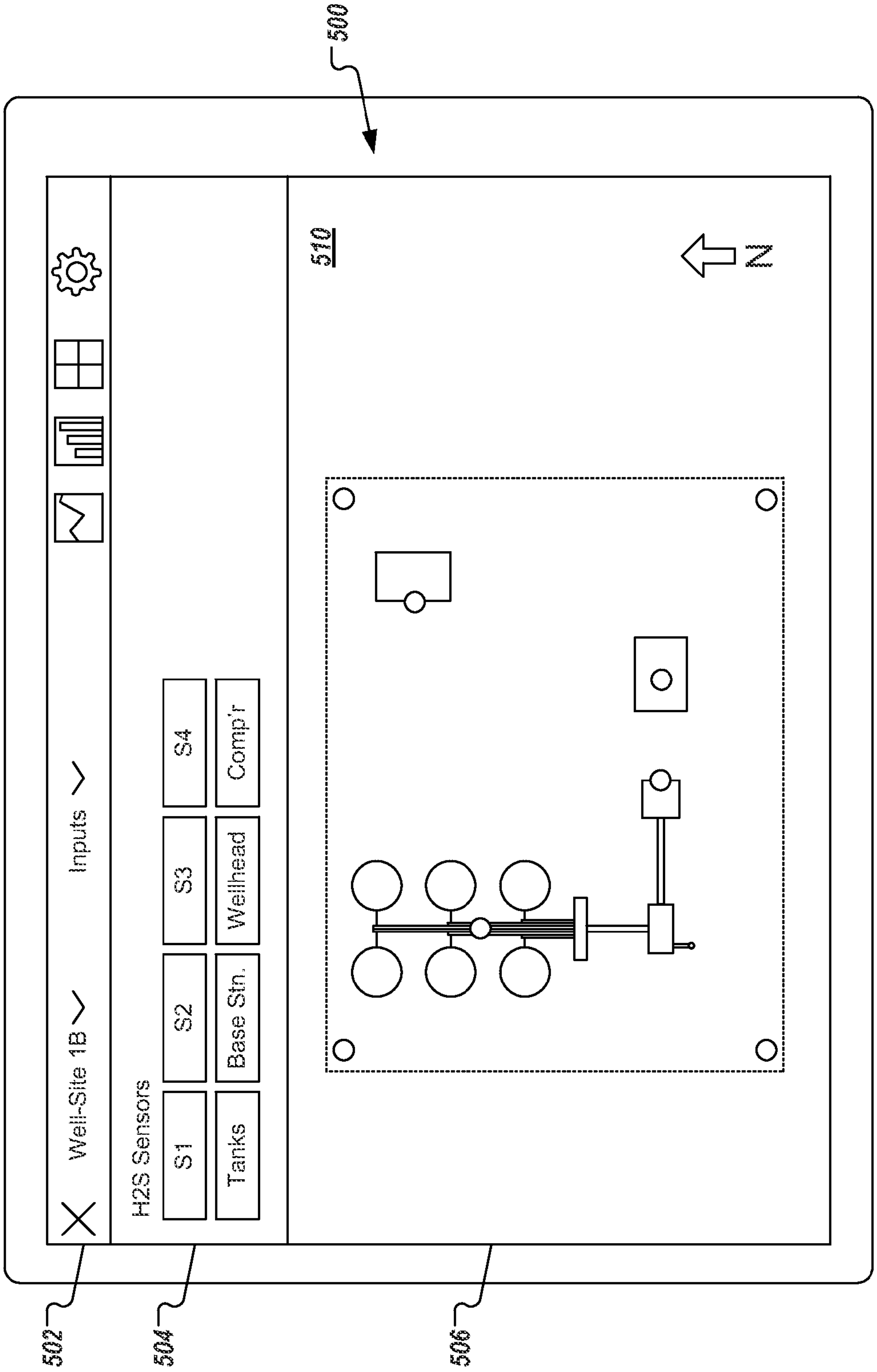
FIGS. 5A-5C depict example screen-shots in accordance with implementations of the present disclosure.
Figure 5B:
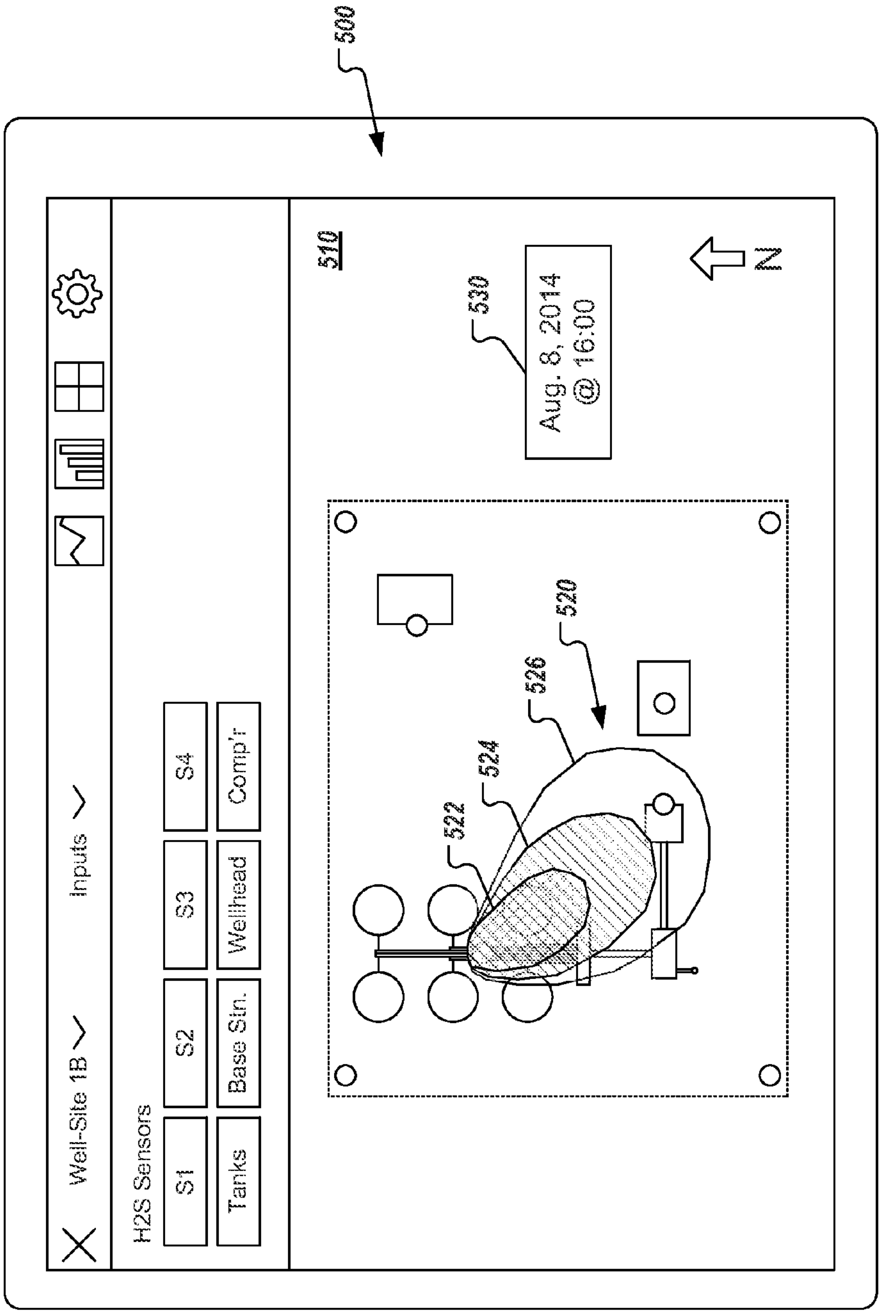
Figure 5C:
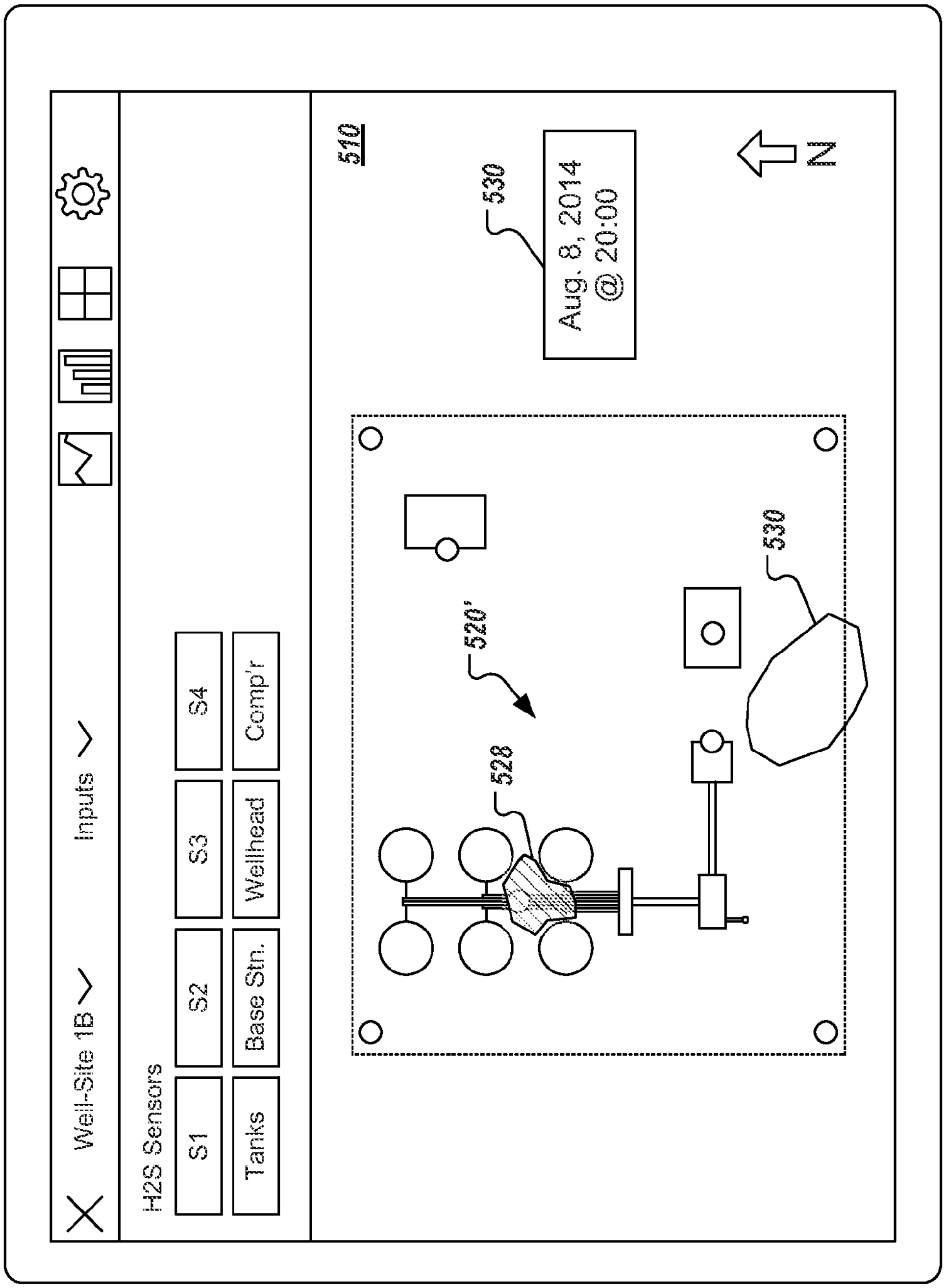

FIGS. 5A-5C depict example screen-shots in accordance with implementations of the present disclosure. More specifically, the example screen-shots of FIGS. 5A-5C provide GUIs depicting graphical representations of a well-site. With particular reference to FIG. 5A, a GUI 500 includes a well-site indicator frame 502, a sensor selection frame 504, and a graphical representation frame 504. In some examples, the well-site indicator frame 502 provides an identifier indicating the particular well-site being viewed within the GUI 500. In some examples, the sensor selection frame 504 provides a list of sensors present at the particular well-site based on sensor type. In the depicted example, the sensor type is provided as H2S sensors and, for the particular well-site, perimeter H2S sensors are provided, e.g., S1, S2, S3, S4, and equipment-specific sensors, e.g., storage tanks, base station, wellhead and compressor. In some examples, the graphical representation frame 504 depicts a graphical representation 510 of the well-site identified in the well-site indicator frame 502. In some examples, the graphical representation 510 includes an image of the actual well-site, e.g., a satellite image, an aerial image. In some examples, the graphical representation 510 includes a representation based on the actual well-site, e.g., a drawing of the well-site. In the depicted example, the well-site of the graphical representation 510 includes the example well-site 300 of FIG. 3.

FIG. 5B depicts the graphical representation 510 corresponding to a predicted hazardous condition that has potential to be present at the well-site. In this example, the hazardous condition includes the presence of H2S, e.g., venting of H2S from one or more storage tanks. In some implementations, a condition indicator 520 can be provided. In some examples, the condition indicator 520 is provided based on processing of the data, the one or more models and the one or more prediction rules, as discussed above. In some examples, the condition indicator is provided as a gas map 520, a graphical representation of an actual and/or estimated presence of H2S at the well-site. In the depicted example, the gas map 520 is provided as a heat map that includes a plurality of indicators 522, 524, 526. In some examples, each indicator 522, 524, 526 indicates a predicted concentration, e.g., in PPM, of H2S. In some examples, each indicator 522, 524, 526 can be provided as a respective color and/or pattern that is distinct from colors and/or patterns of other indicators 522, 524, 526.

In some examples, the gas map 520 can be indicative of a first time, or first period of time. For example, the gas map 520 can correspond to a time period, during which H2S is vented from storage tanks. In some examples, the gas map 520 can be animated to depict a progression of the presence of H2S at the well-site during the period of time. In some examples, a time indicator 530 can be provided. In some examples, the time indicator 530 indicates the data and/or time (or time range) at which the predicted condition, graphically represented by the condition indicator 520, is predicted to occur.

FIG. 5C depicts the graphical representation 510 including a gas map 520' at a second time, or second period of time. In the example of FIG. 5C, the gas map 520' includes indicators 528, 530. In some examples, the gas map 520' can correspond to time period, during which H2S is predicted to cease being vented from storage tanks, and is dispersing from the well-site. For example, the indicator 528 can represent H2S that is predicted to pool between storage tanks, and the indicator 530 can represent H2S that is predicted to disperse from the well-site.

In accordance with implementations of the present disclosure, the graphical representations of the predicted hazardous condition enables users to remotely evaluate the well-site. In some examples, visits to a well-site can be scheduled based on predicted hazardous conditions. For example, if a hazardous condition is predicted, e.g., within a threshold probability, one or more technicians can be dispatched to the well-site to institute remedial measures in an effort to avoid occurrence of the predicted hazardous condition.

Implementations of the present disclosure also enable evaluation of well-site design. For example, predicted hazardous conditions can indicate a flaw in the design of a well-site, and can server as a basis for correcting the design at the well-site, and/or at other, similarly positioned/structured well-sites. By way of example, a predicted hazardous condition can be associated with above-ground piping of a well-site. In some examples, the initial design of the well-site could have indicated that predicted well-site conditions were such that above-ground piping could be used, e.g., which can be a cost-savings as compared to under-ground piping. In some examples, predicted hazardous conditions associated with the above-ground piping can indicate a flaw in the design, e.g., in view of the expected conditions. For example, actual well-site conditions can be different than the predicted well-site conditions, in view of which the well-site was designed. Accordingly, it can be determined that the above-ground piping should be changed to under-ground piping to avoid predicted hazardous conditions.

Figure 6:
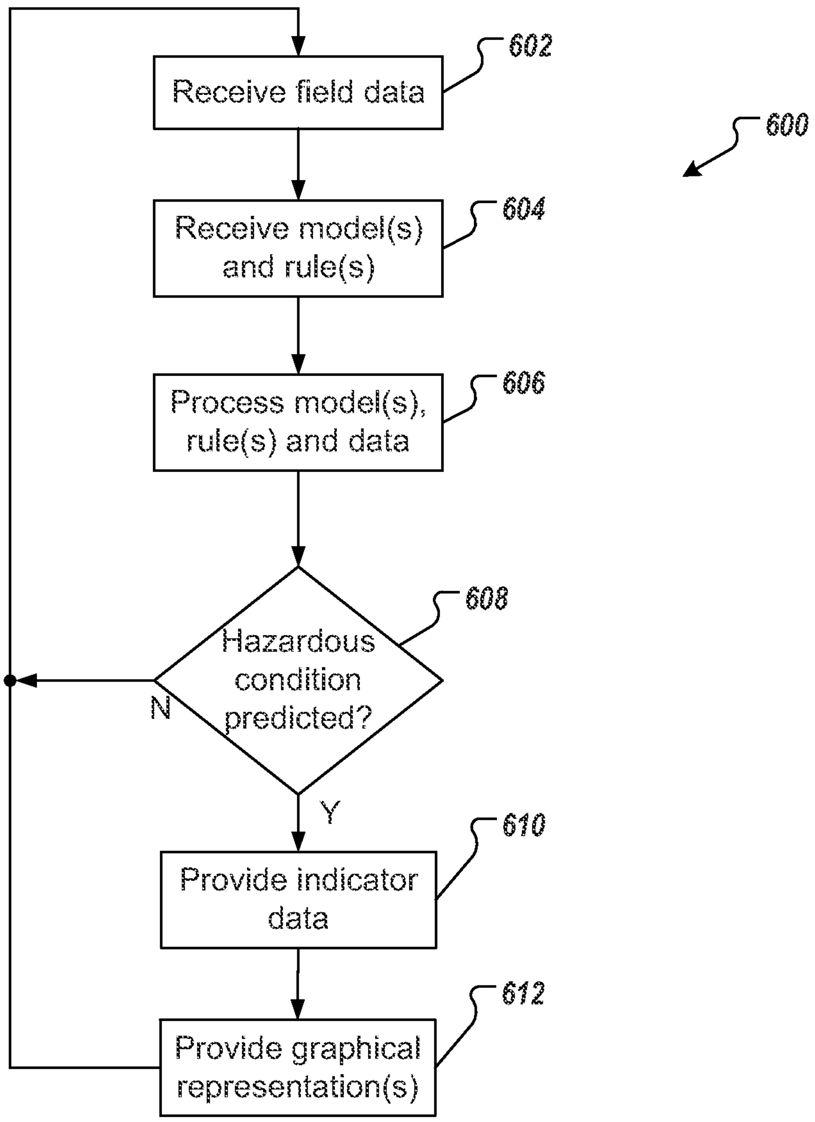
FIG. 6 depicts an example processes that can be executed in accordance with implementations of the present disclosure.

FIG. 6 depicts an example process 600 that can be executed in accordance with implementations of the present disclosure. In some examples, the example process 600 can be provided as one or more computer-executable programs executed using one or more computing devices. In some examples, the example process 600 can be executed for a particular facility, e.g., well-site.

Field data is received (602). For example, a computing cloud, e.g., the computing cloud 107 of FIG. 1, can receive field data. In some examples, the field data can be provided based on signals of sensors provided from one or more well-sites. One or more models and one or more prediction rules are received (604). For example, the computing cloud can receive the model(s) and the rule(s). In some examples, models and/or rules can be specific to the particular site. The model(s), rule(s) and field data are processed (606). For example, the field data is processed by the computing cloud to predict the presence and/or concentration of a hazardous material, e.g., gas.

It is determined whether a hazardous condition is predicted (608). For example, values of the field data can be processed based on the model(s) and rule(s) to predict future values, which future (predicted) values can be compared to one or more thresholds values. In some examples, if a predicted value exceeds a threshold value, it can be determined that a hazardous condition is predicted. If it is determined that a hazardous condition is not predicted, the example process 600 loops back. If it is determined that a hazardous condition is predicted, indicator data is provided (610). In some examples, the computing cloud processes field data, data and the one or more models to provide output data, as discussed above. Further, the output data is processed to provide indicator data, as discussed above. One or more graphical representations are provided (612). For example, the indicator data can be processed to provide one or more condition indicators, e.g., gas maps, within a graphical representation of the facility, e.g., as depicted in FIGS. 5B and 5C, discussed above.

Implementations of the subject matter and the operations described in this specification can be realized in digital electronic circuitry, or in computer software, firmware, or hardware, including the structures disclosed in this specification and their structural equivalents, or in any appropriate combinations thereof. Implementations of the subject matter described in this specification can be realized using one or more computer programs, i.e., one or more modules of computer program instructions, encoded on computer storage medium for execution by, or to control the operation of, data processing apparatus, e.g., one or more processors. In some examples, program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. In some examples, the data processing apparatus can include special purpose logic circuitry, e.g., an FPGA (field programmable gate array) or an ASIC (application specific integrated circuit). In some examples, the data processing apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a mesh network, a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for predicting hazardous conditions at a facility, the method being executed using one or more processors and comprising:

receiving data associated with a site, the site being susceptible to potentially hazardous conditions;

processing, by the one or more processors, the data, one or more models, and one or more prediction rules, wherein the one or more models include a model of physical features of above-ground appurtenances at the site;

determining, by the one or more processors, that a hazardous condition is predicted to occur at the site;

providing, by the one or more processors, output data reflecting the hazardous condition;

processing, by the one or more processors, the output data to provide indicator data for providing a graphical representation of the site, the graphical representation providing a graphical depiction of the hazardous condition; and providing the indicator data to one or more user devices, the indicator data being processed by each of the one or more user devices to display the graphical representation.

2. The method of claim 1, wherein the output data comprises one or more predicted values reflective of the hazardous condition, a predicted value comprising a value that is provided based on an actual value and the one or more models.

3. The method of claim 1, wherein the one or more models comprise at least one of a site model, a fluid-flow model, and a weather model.

4. The method of claim 3, wherein the site model models topographical features of the site.

5. The method of claim 4, wherein topographical features of the site comprise topographical features that are within a threshold distance from the site.

6. The method of claim 3, wherein the fluid-flow model models flow of one or more gases.

7. The method of claim 6, wherein the one or more fluids comprise at least one of hydrogen sulfide (H2S), methane (CH4), carbon monoxide (CO), and carbon dioxide (CO2).

8. The method of claim 1, wherein data comprises data measured at the site.

9. The method of claim 1, wherein the data comprises weather data received from one or more weather sources.

10. The method of claim 9, wherein the weather data comprises at least one of local weather data, regional weather data and national weather data.

11. The method of claim 9, wherein a weather source comprises a weather station located at the site.

12. The method of claim 1, wherein the graphical representation comprises an indicator of the hazardous condition at the site.

13. The method of claim 12, wherein the indicator comprises location and severity of the hazardous condition with respect to the site.

14. The method of claim 12, wherein the graphical representation further comprises a time indicator, the time indicator indicating a date and/or time, at which the hazardous condition is predicted to be present.

15. The method of claim 1, wherein the site comprises at least one of a production well-site, an exploration well-site, a configuration well-site, an injection well-site, an observation well-site, and a drilling well-site.

16. A non-transitory computer-readable storage medium coupled to one or more processors and having instructions stored thereon which, when executed by the one or more processors, cause the one or more processors to perform operations for monitoring and reporting on actual hazardous conditions at a facility, the operations comprising:

receiving data associated with a site, the site being susceptible to potentially hazardous conditions;

processing the data, one or more models, and one or more prediction rules, wherein the one or more models include a model of physical features of above-ground appurtenances at the site;

determining that a hazardous condition is predicted to occur at the site;

providing output data reflecting the hazardous condition;

processing the output data to provide indicator data for providing a graphical representation of the site, the graphical representation providing a graphical depiction of the hazardous condition on gas map of the site that indicates a predicted extent of the hazardous condition; and providing the indicator data to one or more user devices, the indicator data being processed by each of the one or more user devices to display the graphical representation.

17. A system, comprising:

at least one sensor network comprising a plurality of sensors arranged at a site to monitor operational conditions of the site;

a computing system in electronic communication with sensors of the at least one sensor network; and a computer-readable storage device coupled to the computing system and having instructions stored thereon which, when executed by the computing system, cause the computing system to perform operations for predicting hazardous conditions, the operations comprising:

receiving data from the at least one sensor network, the data being associated with the site, the site being susceptible to potentially hazardous conditions;

processing the data, one or more models, and one or more prediction rules, wherein the one or more models include a model of physical features of above-ground appurtenances at the site;

determining that a hazardous condition is predicted to occur at the site;

providing output data reflecting the hazardous condition;

processing the output data to provide indicator data for providing a graphical representation of the site, the graphical representation providing a graphical depiction of the hazardous condition; and providing the indicator data to one or more user devices, the indicator data being processed by each of the one or more user devices to display the graphical representation.

18. The method of claim 1, wherein the data, the one or more models, and the one or more prediction rules are processed to provide the output data and at least a portion of the output data includes a data representing a predicted concentrations of a hazardous gas over time.

19. The method of claim 1, wherein the model of physical features of above-ground appurtenances at the site is a fluid flow model representing fluid flows in relation to the physical features.

20. The method of claim 1, further comprising transmitting a control signal to remotely control functionality of an asset at the site, the control signal being based on the data associated with the site.

* * * * *